(12) United States Patent
Atkins

(10) Patent No.: US 9,894,314 B2
(45) Date of Patent: Feb. 13, 2018

(54) ENCODING, DISTRIBUTING AND DISPLAYING VIDEO DATA CONTAINING CUSTOMIZED VIDEO CONTENT VERSIONS

(75) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 349 days.

(21) Appl. No.: 13/704,416

(22) PCT Filed: Jun. 13, 2011

(86) PCT No.: PCT/US2011/040199
§ 371 (c)(1),
(2), (4) Date: Dec. 14, 2012

(87) PCT Pub. No.: WO2011/159617
PCT Pub. Date: Dec. 22, 2011

(65) Prior Publication Data
US 2013/0088644 A1   Apr. 11, 2013

Related U.S. Application Data

(60) Provisional application No. 61/355,131, filed on Jun. 15, 2010.

(51) Int. Cl.
*H04N 5/58* (2006.01)
*H04N 1/60* (2006.01)
(Continued)

(52) U.S. Cl.
CPC ............... *H04N 5/58* (2013.01); *H04N 1/603* (2013.01); *H04N 1/6088* (2013.01);
(Continued)

(58) Field of Classification Search
CPC ...... H04N 5/58; H04N 1/6058; H04N 9/3194; H04N 5/57; H04N 9/69; H04N 19/187;
(Continued)

(56) References Cited

U.S. PATENT DOCUMENTS 7,859,554 B2 * 12/2010 Young ........................... 345/690
9,042,682 B2 *  5/2015 Atkins .................. G06T 3/4007
                                                   382/300

(Continued)

FOREIGN PATENT DOCUMENTS

EP         2124386         11/2009
JP         09-018806        1/1997
(Continued)

OTHER PUBLICATIONS

Hsu et al., Multi-Layer Video Broadcasting With Low Channel Switching Delays, 2009, IEEE, 978-1-4244-4652-0/09, p. 1-10.*

(Continued)

*Primary Examiner* — Yuehan Wang

(57) ABSTRACT

Methods and apparatus for distributing video data provide video data containing two or more different versions of video content. The different versions may be optimized for display on different displays and/or for viewing under different ambient conditions. Video data optimized for display on a particular display under particular ambient conditions may be obtained by one or more of selecting one of the versions of video content and combining two or more of the versions of the video content.

12 Claims, 6 Drawing Sheets

(51) Int. Cl.

| | | |
|---|---|---|
| *H04N 21/2343* | (2011.01) | |
| *H04N 21/258* | (2011.01) | |
| *H04N 21/2662* | (2011.01) | |
| *H04N 21/422* | (2011.01) | |
| *H04N 21/431* | (2011.01) | |
| *H04N 19/10* | (2014.01) | |

(52) U.S. Cl.
CPC ....... *H04N 19/10* (2014.11); *H04N 21/23439* (2013.01); *H04N 21/234327* (2013.01); *H04N 21/25825* (2013.01); *H04N 21/2662* (2013.01); *H04N 21/42202* (2013.01); *H04N 21/4318* (2013.01)

(58) Field of Classification Search
CPC ................. H04N 19/46; H04N 19/597; H04N 21/234327; H04N 13/0048; H04N 13/0066; H04N 13/04; G06F 3/1423; G06F 3/1462
USPC ............................ 345/589; 348/602; 375/240
See application file for complete search history.

(56) References Cited

U.S. PATENT DOCUMENTS

| | | |
|---|---|---|
| 2004/0008208 A1 | 1/2004 | Dresevic |
| 2005/0129123 A1 | 6/2005 | Xu |
| 2005/0160468 A1 | 7/2005 | Rodriguez |
| 2005/0226196 A1 | 10/2005 | Suh |
| 2005/0281404 A1 | 12/2005 | Yu |
| 2006/0083434 A1 | 4/2006 | Inata |
| 2006/0209005 A1 | 9/2006 | Pedram |
| 2007/0053293 A1 | 3/2007 | McDonald |
| 2007/0061862 A1 | 3/2007 | Berger |
| 2007/0130626 A1 | 6/2007 | Kato |
| 2007/0146356 A1 | 6/2007 | Ladouceur |
| 2008/0013620 A1 | 1/2008 | Hannuksela |
| 2008/0068446 A1 | 3/2008 | Barkley |
| 2008/0098446 A1 | 4/2008 | Seckin |
| 2009/0097548 A1 | 4/2009 | Karczewicz |
| 2009/0225869 A1 | 9/2009 | Cho |
| 2010/0103186 A1* | 4/2010 | Luengen et al. ............. 345/589 |
| 2010/0265264 A1* | 10/2010 | Doser ..................... G09G 5/02 345/590 |

FOREIGN PATENT DOCUMENTS

| | | |
|---|---|---|
| JP | 2008-519497 | 6/2008 |
| JP | 2008-288859 | 11/2008 |
| JP | 2009-124647 | 6/2009 |
| JP | 2009-244340 | 10/2009 |
| JP | 2010-124197 | 6/2010 |
| WO | 2009/097584 | 10/2002 |
| WO | 2008/049446 | 5/2008 |
| WO | 2008/148708 | 12/2008 |
| WO | 2009/002324 | 12/2008 |
| WO | WO 2009002324 A1 * | 12/2008 ............... H04N 7/24 |
| WO | 2009/032214 | 3/2009 |
| WO | 2009/050188 | 4/2009 |
| WO | 2010-021705 | 2/2010 |
| WO | WO 2010021705 A1 * | 2/2010 ............... H04N 7/24 |

OTHER PUBLICATIONS

Hsu, Cheng-Hsin, et al. "Multi-Layer Video Broadcasting with Lowchannel Switching Delays" School of Computing Science Simon Fraser University Surrey, BC Canada, 2009.

Cuetos, P. et al. "Adaptive Streaming of Stored Video in a TCP-Friendly Context: Multiple Versions or Multiple Layers?" Packet Video Workshop 2001.

Wien, M. et al. "Real-Time System for Adaptive Video Streaming Based on SVC" IEEE Transactions on Circuits and Systems for Video Technology, vol. 17, No. 9, Sep. 2007.

Liu, J. et al. "Adaptive Video Multicast Over the Internet" IEEE Multimedia, vol. 10, No. 1, pp. 22-33, Jan.-Mar. 2003.

* cited by examiner

_US 9,894,314 B2_

ENCODING, DISTRIBUTING AND DISPLAYING VIDEO DATA CONTAINING CUSTOMIZED VIDEO CONTENT VERSIONS

CROSS-REFERENCE TO RELATED APPLICATIONS

This application claims priority to U.S. Provisional Patent Application No. 61/355,131 filed 15 Jun. 2010 hereby incorporated by reference in its entirety.

TECHNICAL FIELD

The invention relates to video data and in particular to methods and apparatus for distributing video data. Embodiments of the invention provide methods for distributing video data; video data formats; apparatus for delivering video data; apparatus for receiving video data; and apparatus for processing video data.

BACKGROUND

Displays include televisions, computer monitors, home cinema displays, digital cinema displays, dedicated displays on devices such as tablet computers, cellular telephones, digital cameras, copiers, industrial controls, specialized displays such as displays for medical imaging, virtual reality, vehicle simulation and the like. Color displays may be used to display color images specified by image data.

Displays may incorporate any of a wide variety of underlying display technologies. For example, displays may comprise: cathode ray tube (CRT) displays; backlit liquid crystal displays (LCDs); plasma displays; organic LED displays (OLED displays); laser projectors; digital minor device (DMD) displays; and electroluminescent displays. Within any of these general technologies a wide variety of different constructions and compositions for light-emitting and/or filtering elements are possible. Different displays may have capabilities that differ significantly in areas such as: the range of different colors (gamut) that can be displayed; the maximum brightness achievable; the contrast ratio; the resolution; the color depth; available dynamic range; the white level, the white point, the black point, the number of grey steps, and the like.

Consequently, the same video content may appear different when played back on different displays. Video content displayed on some displays without modification may depart from the creator's creative intent in one or more ways.

Some current displays can outperform displays that were state-of-the-art at a time when certain video content was created. For example, the displays may be capable of providing images that have brighter highlights, greater contrast, and/or wider color gamuts than legacy displays that were originally available when the video production was created. It would be desirable to take advantage of these improved capabilities without departing significantly from the creative intent embodied in the video content.

It may be desirable to play video content created to take advantage of high-performance displays on legacy displays or displays that have lower capabilities. It would be desirable to provide methods and apparatus for adapting the way that the video is played to preserve as much as possible a creative intent embodied in the video content.

The perception of colour and luminance can be affected by ambient conditions. A video presented under theatre conditions may be perceived by viewers significantly differently when viewed in a location where there is significant ambient light. Further, the characteristics (such as the colour temperature) of ambient light can affect a viewer's perception of video content. It would be desirable to adapt the playback of video content taking into account the environment in which the video content is being viewed to preserve as much as possible a creative intent embodied in the video content.

There is a need to provide viewers of images (including still and/or video images) with viewing experiences that exploit the capabilities of displays on which they view the images. There remains a need for apparatus and methods which may be applied to adjust video signals such that video or other image content encoded in the signals has a desired appearance when played.

SUMMARY OF THE INVENTION

The invention provides methods and apparatus for dealing with video data containing two or more different versions of video content. The different versions may be optimized for display on different displays and/or for viewing under different ambient conditions.

One aspect of the invention provides methods for distributing video data which involve packaging a plurality of versions of the same video content together. Another aspect of the invention provides methods for delivering video content optimized for a display which involve generating the optimized video content from a plurality of different versions of the video content. The optimized video content may be generated, for example, by interpolating or extrapolating between the two different versions of the video content. Another aspect of the invention provides a data processing stage configured to generate video content optimized for display on a destination display from a plurality of different versions of the video content. Another aspect of the invention provides a media server comprising a data store containing a plurality of versions of the same video content and configured to generate optimized video content optimized for display on a destination display by one or more of: selecting one of the versions of the video content that is optimized for display on the destination display and generating the optimized video content from a plurality of the different versions of the video content.

Another aspect provides methods for delivering video content optimized for displaying on a destination display. The methods comprise providing video data comprising at least different first and second versions of the video content; and interpolating or extrapolating between the first and second versions of the video content to yield a third version of the video content.

Another aspect provides methods for delivering video content optimized for displaying on a destination display. The methods comprise providing in a single data entity video data comprising a plurality of different versions of the video content wherein the different versions include versions having one or more of: different gamuts; different frame rates; different bit depth; and different spatial resolutions. The methods determine capabilities of a destination display and select and decode one of the different versions for display on the destination display.

Another aspect provides video processing apparatus comprising a data processing stage. the data processing stage is configured to read video data encoding a plurality of different versions of a video content. The different versions include versions having one or more of: different gamuts; different frame rates; and different bit depths. the apparatus is configured to determine whether one of the versions is optimized for display on a destination display and, in response to determining that one of the version is optimized for display on the destination display, provide the one of the versions for display on the destination display.

Another aspect provides video processing apparatus comprising a decoder configured to extract a base layer and one or more enhancement layers from a video signal to yield a plurality of input signals each encoding a different version of a video content and an interpolation unit connected to receive the plurality of input signals and to output a an output signal that is an interpolation of the different versions corresponding to the input signals.

Another aspect provides a non-transitory medium comprising computer-readable video data encoding a plurality of different versions of a video content wherein the different versions include versions that one or more of: have different gamuts; have different frame rates; have different bit depths; and are optimized for viewing under different levels of ambient light.

Another aspect provides a color grading station comprising: a data store containing a video content; a plurality of displays; and a controller. The controller is configured to:

display the video content on each of the plurality of displays; receive corresponding user input comprising optimizations of the video content for display on each of the plurality of displays; store a plurality of versions of the video content, each of the plurality of versions comprising the optimizations associated with one of the plurality of displays; and combine the plurality of versions into a computer-readable video data encoding the plurality of different versions of the video content.

Further aspects of the invention and features of specific embodiments of the invention are described below and/or illustrated in the drawings.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of this invention relates to formats for the delivery of video data. The formats provide a base layer and a number of enhancement layers. Each enhancement layer may provide one or more of the following, for example:

a wider gamut;
optimization for different ambient conditions (e.g. if the base layer is optimized for viewing in ambient light having an illuminance of 100 lux or less one enhancement layer may provide a version optimized for viewing in ambient light having an illuminance of 1000 lux or some other illuminance);
increased frame rate(s);
increased dynamic range;
increased bit depth;
3D information (such as one or more additional viewpoints);
increased spatial resolution.

In some embodiments, base layer corresponds to a video signal having a lower capability such as a Rec. 709 compliant video signal. In some embodiments an enhancement layer corresponds to a video signal having a higher capability such as a video signal in a format comprising color ranges sufficient to specify colors in a gamut that encompasses all colors perceptible by the human visual system.

Figure 1:
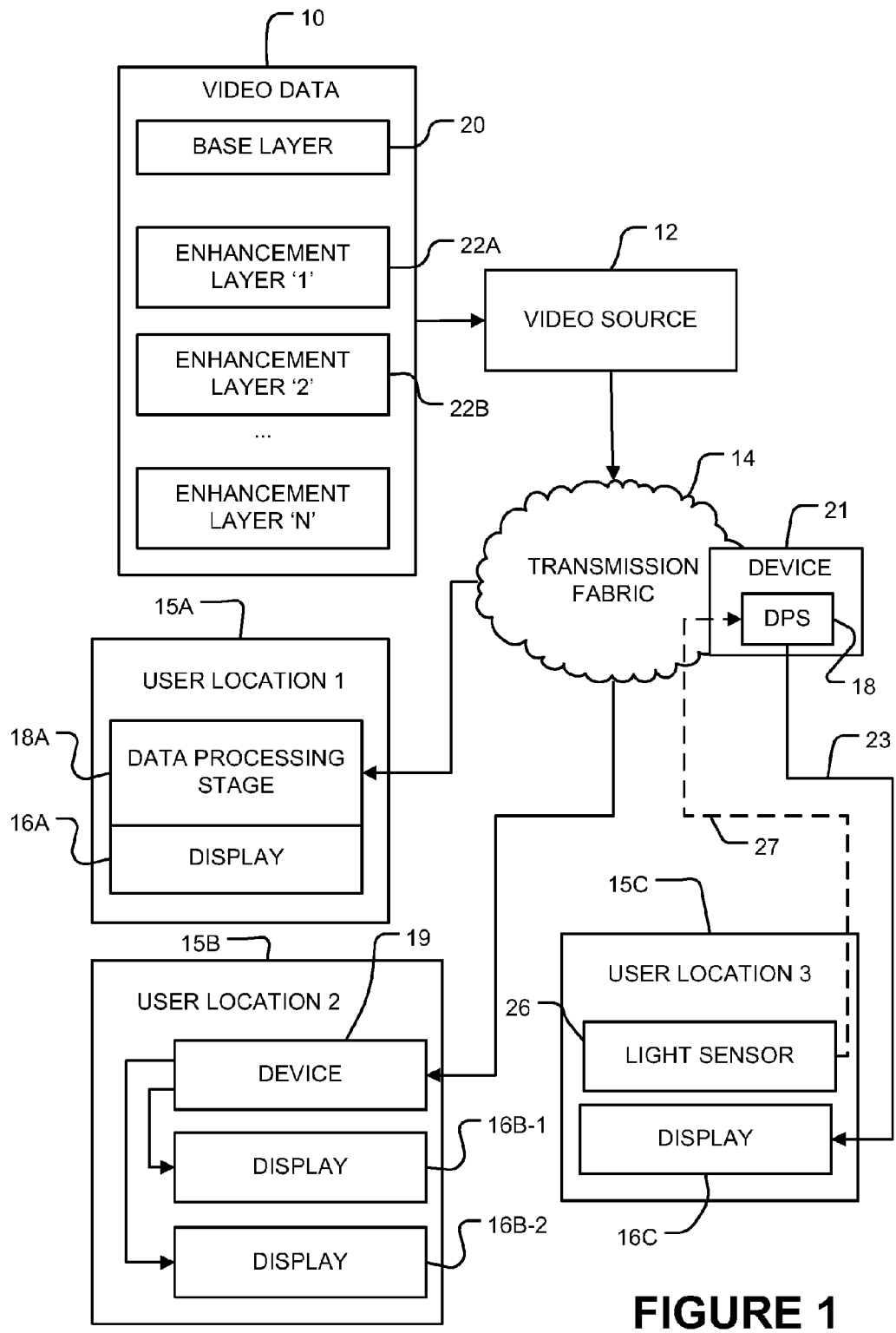
FIG. 1 is a schematic diagram of a video data distribution system.

Multiple different enhancement layers may be pro vided to satisfy the needs of various viewers. FIG. 1 illustrates an example embodiment in which video data 10 is carried from a video source 12 by a transmission fabric 14 to a plurality of user locations 15 (e.g., locations 15A, 15B and 15C as shown in FIG. 1). In this embodiment, video data 10 is in a format that comprises base layer 20 and first and second enhancement layers 22A, and 22B.

Transmission fabric 14 may comprise, for example, the internet, a cable television system, a wireless broadcasting system, media that are distributed such as DVDs, other data storage devices that contain video data, or any other data communication system capable of delivering video data 10 to user locations 15.

Various displays 16 are located at user locations 15. In the illustrated embodiment, a user location 15A has a display 16A, a user location 15B has displays 16B-1 and 16B-2 and a user location 15C has a display 16C.

The base layer 20 provides for compatibility with lowest common denominator displays. For example, the base layer may provide video data that is in or can be readily converted into a format as specified by ITU-R Recommendation BT.709 (otherwise known as Rec. 709) or another widely adopted format.

In this example embodiment, first enhancement layer 22A provides a version of the video data which has an expanded gamut suitable for display on a display capable of reproducing colors outside of a gamut of the base layer and is optimized for display under dim ambient conditions. Second enhancement layer 22B is similar to enhancement layer 22A but is optimized for display under brighter ambient conditions.

Video data 10 passes through a data processing stage 18 before it is displayed. As shown in the illustrated embodiment, the data processing stage 18 may be located in a display 16 (as is the case with display 16A) in an upstream device 19 at the user location 15 (as is the case at user location 15B) or in an upstream device 21 outside of the user location (as is the case for user location 15C). An upstream device 21 may be located in transmission fabric 14 or at video source 12 for example.

As a non-limiting example, an upstream device 19 may comprise a transcoder, cable modem, set-top box or the like. An upstream device 21 may comprise a transcoder, video distribution system head end, video server, or the like.

Data processing stage 18 extracts from video data 10 the data required to create a video stream 23 optimized for display on a particular display 16. In some embodiments, data processing stage 18 extracts a video stream 23 that is selected for the ambient conditions in which the display 16 is being viewed. In some embodiments, a light sensor 26 associated with the display 16 detects ambient light (intensity and/or color) and communicates ambient light information 27 about the ambient light to data processing stage 18. Data processing stage 18 may then use ambient light information 27 to configure itself to deliver an appropriate video stream 23 to display 16.

In other embodiments, data processing stage 18 accesses previously stored account or user preference information (not shown) to configure itself to deliver an appropriate video stream 23 to display 16. The previously-stored information may, for example, indicate that a particular display is used in a darkened theater. In other embodiments, data processing stage 18 receives user input regarding ambient conditions at the location of a display and uses that user input to configure itself to deliver an appropriate video stream 23 to display 16. The user input may, for example, be accepted at a computer, display, remote control, portable digital device, smart phone or the like and delivered to data processing stage 18 by way of any suitable data communication path.

Data processing stage 18 may comprise, for example a programmed processor executing suitable software and/or firmware instructions, configurable hardware, such as a suitably configured field programmable gate array (FPGA), hardware logic circuits (for example provided in one or more integrated circuits), or suitable combinations thereof. Data processing stage 18 may be hosted in a computer, a video-handling device, such as a transcoder, set-top box, digital video recorder, or the like, a display, such as a television, home theater display, digital cinema projector, computer video system, or the like, a component of a data transmission fabric, such as a cable television head end, a network access point or the like. Example embodiments provide such apparatus hosting a data processing stage 18 as described herein.

In some embodiments, data processing stage 18 involves decoding video data 10, if necessary, and selection of one or more of base layer 20 and/or one or more enhancement layers 22 appropriate to the intended destination display 16. In other embodiments data processing stage 18 creates video data that is based on but different from any of base layer 20 and enhancement layers 22. The data processing stage 18 may deliver the new data as a video stream 23 or store the new data as a file for later display on the destination display 16.

Figure 2:
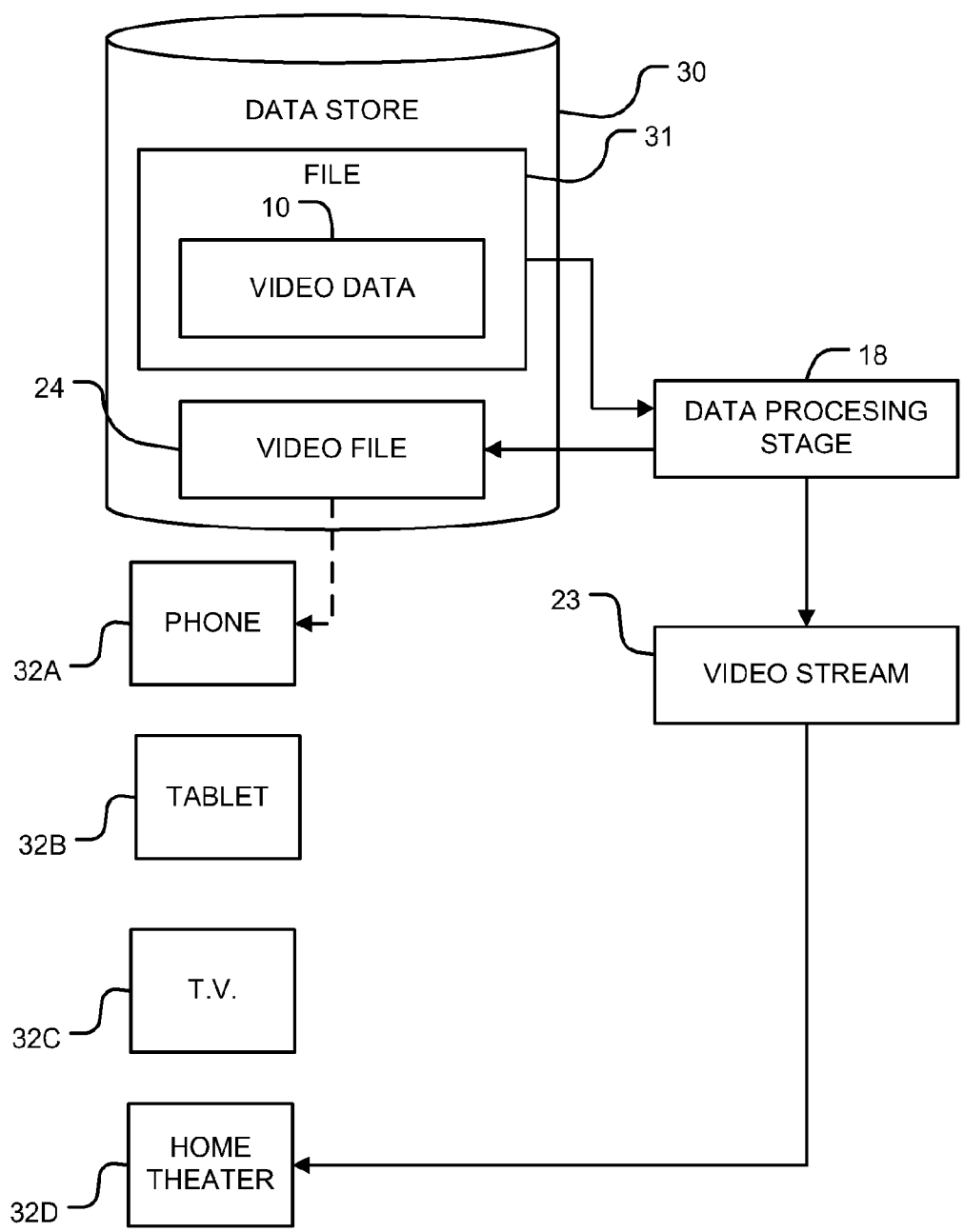
FIG. 2 is a schematic diagram of a user location including multiple different display devices.

Video data 10 may be streamed as illustrated in FIG. 1 or reside in a file structure. As shown in FIG. 2, a user may maintain a file 31 containing video data 10 in a data store 30 that is accessible by various viewing devices. For example, the user may have a smart phone 32A, a tablet computer 32B, a basic television 32C and a high-end home theater system 32D all capable of displaying video content. Each of these devices may have different capabilities for video display.

Data processing stage 18 prepares video content of video data 10 is prepared for playback on one of devices 32 by selecting those of base layer 20 and/or one or more enhancement layers 22 appropriate to the selected device 32 and generating a video file 24 or stream 23 for playback on the device. The generation of file 24 and/or stream 23 may be performed by a data processing stage 18 at any of a number of times including:

in advance (for example, upon the user downloading or otherwise acquiring video data 10 a data processing stage 18 could automatically generate and store files 24 optimized for display on one or more of the user's devices).

when video data is downloaded for playback on a particular device.

when a particular device is synced to a media collection including video data 10.

while video data is being streamed to a particular device.

Figure 3:
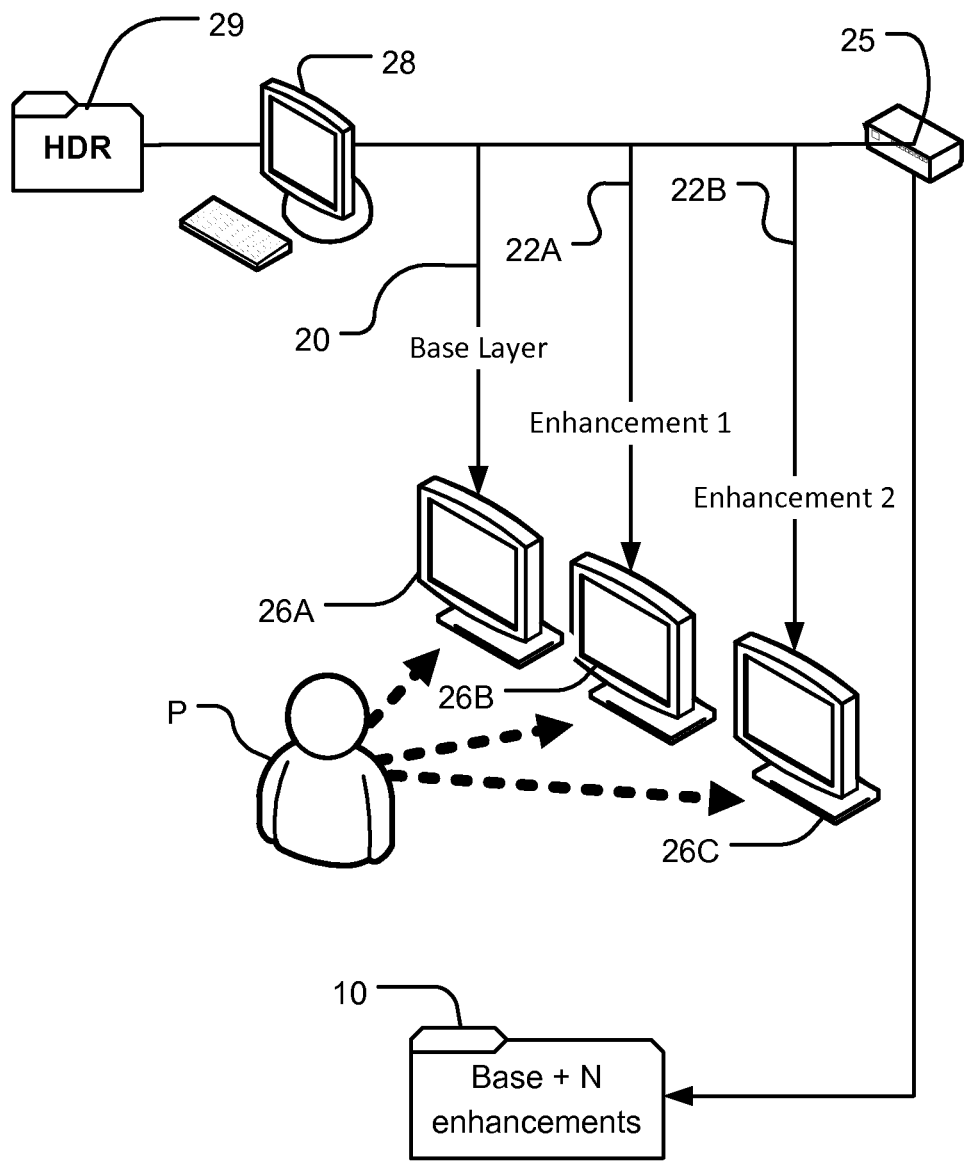
FIG. 3 is a schematic diagram of a video production system.

As illustrated in FIG. 3, providing video data 10 which includes versions optimized for displaying video content on different displays and/or under different viewing conditions can facilitate maintaining creative control over the way that the video content appears to users. A producer of a video may have a specific creative intent that is intended to be conveyed to users through factors such as the specific palette of colors used in a scene, the contrast of a scene, the maximum brightness of a scene, etc. These and similar factors affect how the scene is perceived by viewers. The creative intent is content and producer-dependent and is very difficult to determine analytically.

For example, it is hard or impossible to program a computer to answer the question: "How would a particular producer of particular video content have made the video content different if the producer intended that video content to be viewed on a specified display having specified capabilities under specified ambient viewing conditions?" As shown in FIG. 3, video data 10 contains multiple versions of the video content. A producer P may separately optimize and approve each one of the multiple versions.

In the illustrated embodiment, producer P has access to a number of reference displays 26. Reference display 26A is a standard reference display viewed in a dark environment. The producer may view video content for base layer 20 on display 26A and use a color grading station 28 to optimize the appearance of the video content on display 26A according to the producer's creative intent. Color grading station 28 may take as input high-quality video data 29. Video data 29 may, for example, have a high dynamic range, wide gamut, and large bit depth.

In the illustrated embodiment, the producer also has access to a display 26B that has an extended gamut and extended dynamic range. The producer may view video content for enhancement layer 22A on display 26B under dark ambient conditions and use color grading station 28 to optimize the appearance of the video content for enhancement layer 22A on display 26B according to the producer's creative intent.

The producer may also view the video content for enhancement layer 22B on display 26C under bright ambient conditions and use color grading station 28 to optimize the appearance of the video content for enhancement layer 22B on display 26C according to the producer's creative intent. Color grading station 28 may comprise automated or semi automated tools to assist the producer in efficiently creating multiple versions of the video content for display on different displays under different ambient conditions.

After the producer has approved a version of the video content for the base layer and enhancement layers, an encoder 25 writes the approved versions of the video content to video data 10.

Thus, video data 10 may contain a number of different versions of the same video content each optimized for use on different displays and/or different viewing conditions according to the creative intent of producer P. This permits users to enjoy the video content in a manner that closely matches the producer's creative intent.

If the base layer or an enhancement layer of video data 10 is already optimized in a manner suitable for the destination display then a video signal based on the layer may be passed to the destination device. In some embodiments, the data processing stage 18 is configured to determine whether the capability and ambient conditions of a destination display match (either exactly or to within some threshold) the capability and ambient conditions for which one of the base layer 20 and enhancement layers 22 is optimized. If so, it may pass a video signal from the matching one of the layers to be output without modification.

It is not necessary that video data 10 contain enhancement layers 22 optimized for every possible display in every possible set of viewing conditions. As noted above, a data processing stage 18 may generate video data for a particular display that is based on but different from the base layer and the enhancement layers. In some embodiments, this involves interpolation and/or extrapolation between the base layer and an enhancement layer and/or between two enhancement layers. The interpolation or extrapolation may be based on capabilities of a target display relative to capabilities associated with the two layers.

Data processing stage 18 may receive information regarding the capabilities of the target display and/or ambient lighting conditions at the target display in any of various ways. some examples are:
  Data processing stage 18 may be hard-wired or hard-coded with the capabilities of a particular target display. This may be most appropriate, for example, in embodiments in which data processing stage 18 is integrated into a display and/or dedicated to a particular display.
  Data processing stage 18 may comprise or be connected to access a memory, set of registers or the like containing information describing the capabilities of a particular target display. This may be most appropriate, for example, in embodiments in which data processing stage 18 is integrated with a set top box or other apparatus that is dedicated to one or more particular displays in use.
  Data processing stage 18 may communicate with the target display by way of a communication path that also carries a video signal to the target display.
  Data processing stage 18 may be in mutual data communication by way of the internet or another data communication pathway and may exchange information including information about the capabilities of the target display.
  The target display may be in or associated with a device that may docked or other wise connected periodically to a server to receive data uploads. The device may transfer information regarding the capabilities of the target display to the server or the data processing stage 18 in the course of connecting to the server.

Data processing stage 18 may derive video stream 23 or file 24 by interpolation and/or extrapolation from video streams corresponding to two or more of base layer 20 and enhancement layers 22. In cases where all of the versions of video content in video data 10 have been individually optimized to preserve a creative intent (for example by suitable color timing), the interpolated or extrapolated values may be expected to preserve that creative intent.

Figure 4A:
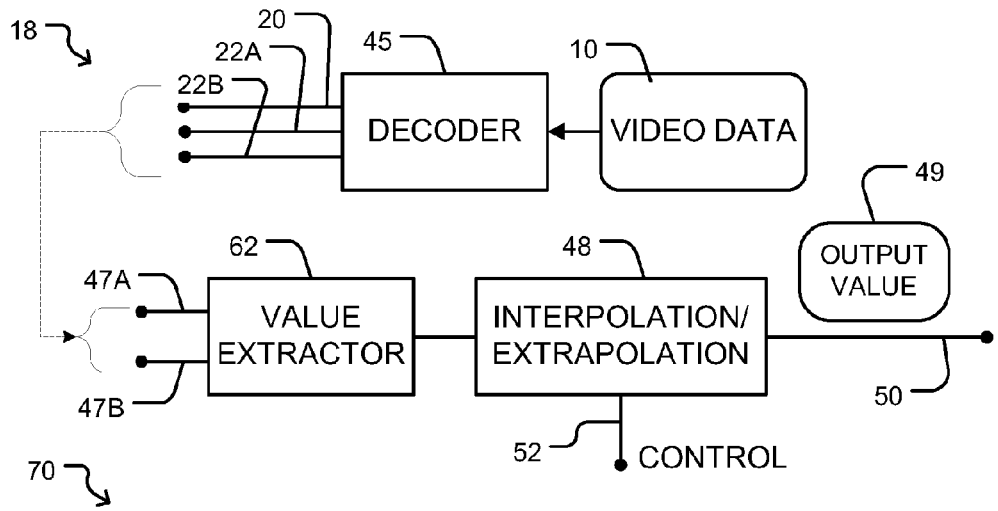
FIG. 4A is a diagram illustrating a data processing stage configured to perform interpolation to provide an optimized video signal.
Figure 4B:
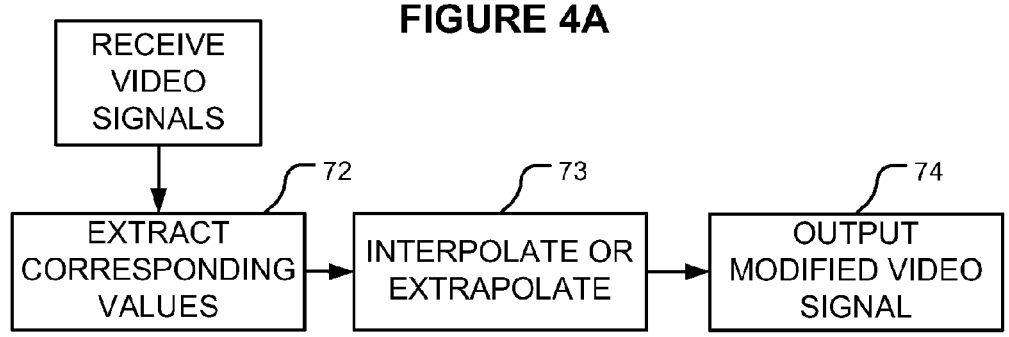
FIG. 4B is a flowchart illustrating a method for providing an optimized video signal by interpolation.

FIG. 4A is a block diagram illustrating the components of an example data processing stage 18 configured to generate optimized video data based on two or more versions of video content from video data 10. FIG. 4B is a flowchart illustrating a method 70 for generating optimized video data based on two or more input versions of video content. Data processing stage 18 comprises a decoder 45 that extracts base layer 20 and/or one or more enhancement layers 22 from video data 10. In the illustrated embodiment, video data 10 includes a base layer 20 and two enhancement layers 22A and 22B. In some embodiments, decoder 45 extracts only those of the base layer 20 and enhancement layers 22 that will be used to generate video content optimized for a particular display. Decoder 45 provides two input signals 47A and 47B to an interpolation/extrapolation block 48.

Each of the input signals 47A and B comprises pixel values which may be received as video signals in 70 in FIG. 4B. The pixel values may, for example, comprise values of a tone and/or color coordinates in a color space which may be extracted by value extractor 62 as shown in FIG. 4A or in step 72 of FIG. 4B. In some embodiments the color space is a perceptually linear color space.

Interpolation/extrapolation block 48 is configured to generate an output value 49 by interpolating or extrapolating (step 73) between corresponding pixel values of input signals 47. Interpolation/extrapolation block 48 provides output value 49 in a modified video signal (step 74) at an output 50. A control input 52 of interpolation/extrapolation block 48 receives a control value that controls the operation of interpolation/extrapolation block 48. In a simple embodiment the control value is applied in interpolation/extrapolation block 48 to multiply a difference between corresponding values in the first and second video signals 47A and 47B. The interpolation/extrapolation performed by block 48 may be based upon a value or values received at control input 52. The value or values presented at control input 52 may be determined based upon one or more measures of the capability of a destination display and/or one or more measures of ambient conditions at a destination display.

Figure 4C:
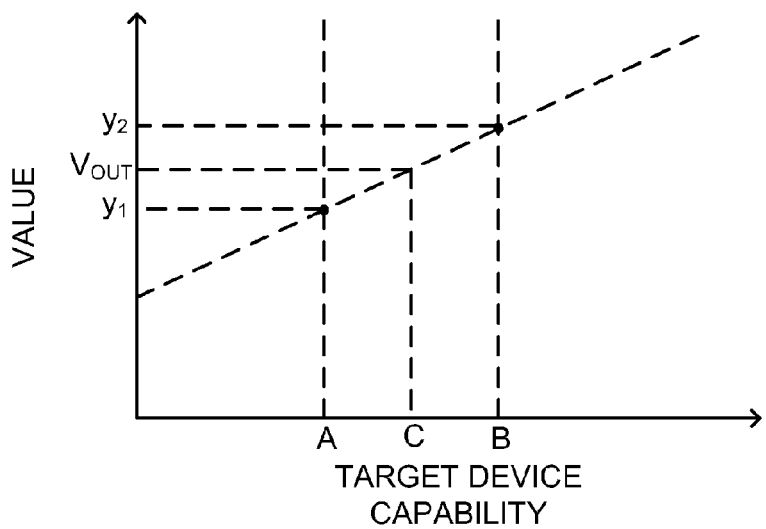
FIG. 4C is a diagram illustrating an example interpolation method.

FIG. 4C illustrates one way in which the interpolation/extrapolation may be performed. In FIG. 4C, a value in the first video signal is $y_1$ and the corresponding value in the second video signal is $y_2$. The horizontal axis in FIG. 4C indicates a destination display capability or a measure of ambient conditions. For example, the horizontal axis may indicate a dynamic range of a destination display or may indicate a logarithm of a maximum luminance of a destination display according to some index. The first video signal 47A contains a version of video content that is optimized for display by a display having a capability A and the second video signal 47B contains a version of the video content that is optimized for display on a display having a capability B. If the destination display for the video signal has the capability C then an output value may be determined, for example, according to:

$$V_{OUT} = y_1 + \left(\frac{y_2 - y_1}{B - A}\right)(C - A) \qquad 1$$

(C-A) may be positive or negative. |C-A| may be greater or less than |B-A|.

A feature of Equation (1) is that $V_{OUT}$ is the same as $y_1$ and $y_2$ if $y_1=y_2$. Thus, if a creator has deliberately set $y_1$ and $y_2$ to be the same in first and second versions of the video content represented by the first and second video signals then embodiments which apply Equation (1), as well as other embodiments that share this feature, will preserve this value in the output video signal. On the other hand, where $y_1 \neq y_2$, $V_{OUT}$ may be different from both of $y_1$ and $y_2$.

In some embodiments, data processing stage 18 is configured to interpolate/extrapolate following perceptual curves. For example, data processing stage 18 may be configured to interpolate/extrapolate on the logarithm of the luminance. In some embodiments, video data is provided in or converted into a perceptually uniform color space (such as, for example, IPT or Log Yuv) before performing interpolation/extrapolation.

In some embodiments, interpolation between video data may be performed according to the following equations:

$$Y_{MDR} = e^{(\alpha \log Y_{LDR} + \log(\beta Y_{VDR}))} \quad 2$$

$$x_{MDR} = \alpha x_{LDR} + \beta x_{VDR} \quad 3$$

$$y_{MDR} = \alpha y_{LDR} + \beta y_{VDR} \quad 4$$

where: Y is a luminance coordinate in a color space such as Log Yxy or Log Y u'v'; the subscript VDR (as in $Y_{VDR}$, for example) identifies data from the video signal having the higher capability (e.g. higher dynamic range and/or broader color gamut); the subscript LDR identifies data from the video signal having the lower capability; the subscript MDR identifies the output or target video signal; $\alpha$ and $\beta$. are interpolation constants; and x and y are color coordinates (for example, x and y in a Log Yxy color space or u' and v' in a Log Yu'v' color space). Here, a may be given, for example, by:

$$\alpha = \frac{\log(\max(Y_{VDR})) - \log(\max(Y_{TARGET}))}{\log(\max(Y_{VDR})) - \log(\max(Y_{LDR}))} \quad 5$$

where: max ($Y_{VDR}$) is the maximum value for Y that can be specified in the VDR (higher-capability) video signal, max $Y_{LDR}$ is the maximum value for Y that can be specified in the LDR (lower-capability) video signal, and max ($Y_{TARGET}$) is the maximum value for Y that can be reproduced on the target display. $\beta$ may be given by $\beta = 1 - \alpha$.

Example 1

In one example embodiment, interpolation is performed between two enhancement layers which respectively contain a version of video content optimized for viewing in dark ambient conditions and another version of the video content optimized for viewing in brighter ambient conditions. The interpolation may be fixed. In the alternative, the interpolation may be variable depending upon the ambient light at the destination display. In some embodiments ambient light information 27 is provided at input 52 of an interpolation/extrapolation engine 48. In such embodiments ambient light information 27 may control the relative weights given to the two input signals 47A and 47B.

Example 2

In another example embodiment, a destination display 16 or device 32 has a gamut that extends beyond a gamut assumed by base layer 20. In such embodiments, interpolation may be performed between base layer 20 and an enhancement layer 22 optimized for a wide gamut display. The relative weights given to the base layer and enhancement layer in the interpolation may be based upon a measure of how large is the gamut of the destination display as compared to the gamuts assumed by the base layer 20 and enhancement layer 22.

Example 3

In some embodiments, a video signal produced for a destination display is based on more than two versions of video content from video data 10. For example, a destination display may be capable of reproducing colors in a gamut that is broader in some respects than a gamut assumed by the base layer and the ambient lighting at the destination display may be bright. Data processing stage 18 may be configured to first interpolate between two enhancement layers based on the ambient conditions at the destination display as described in "Example 1" above and then interpolate between the resulting signal and the base layer based on the relative capabilities of the destination display as described in "Example 2" above.

Video data 10 may have a wide range of structures capable of containing the two or more different versions of video content optimized for different displays and/or viewing conditions. While the different versions of video content may be independently represented in video data 10 it is typically much more efficient to encode the enhancement layers in terms of differences from the base layer or vice versa. In one example, video data 10 comprises a bitstream containing multiple layers which can be decoded selectively. The different layers may be delivered using a scalable video codec similar, for example, to the encoding scheme provided by Annex G, of the H. 264/MPEG-4 AVC video compression standard, sometimes called "Scalable Video Coding" or "SVC".

Figure 5A:
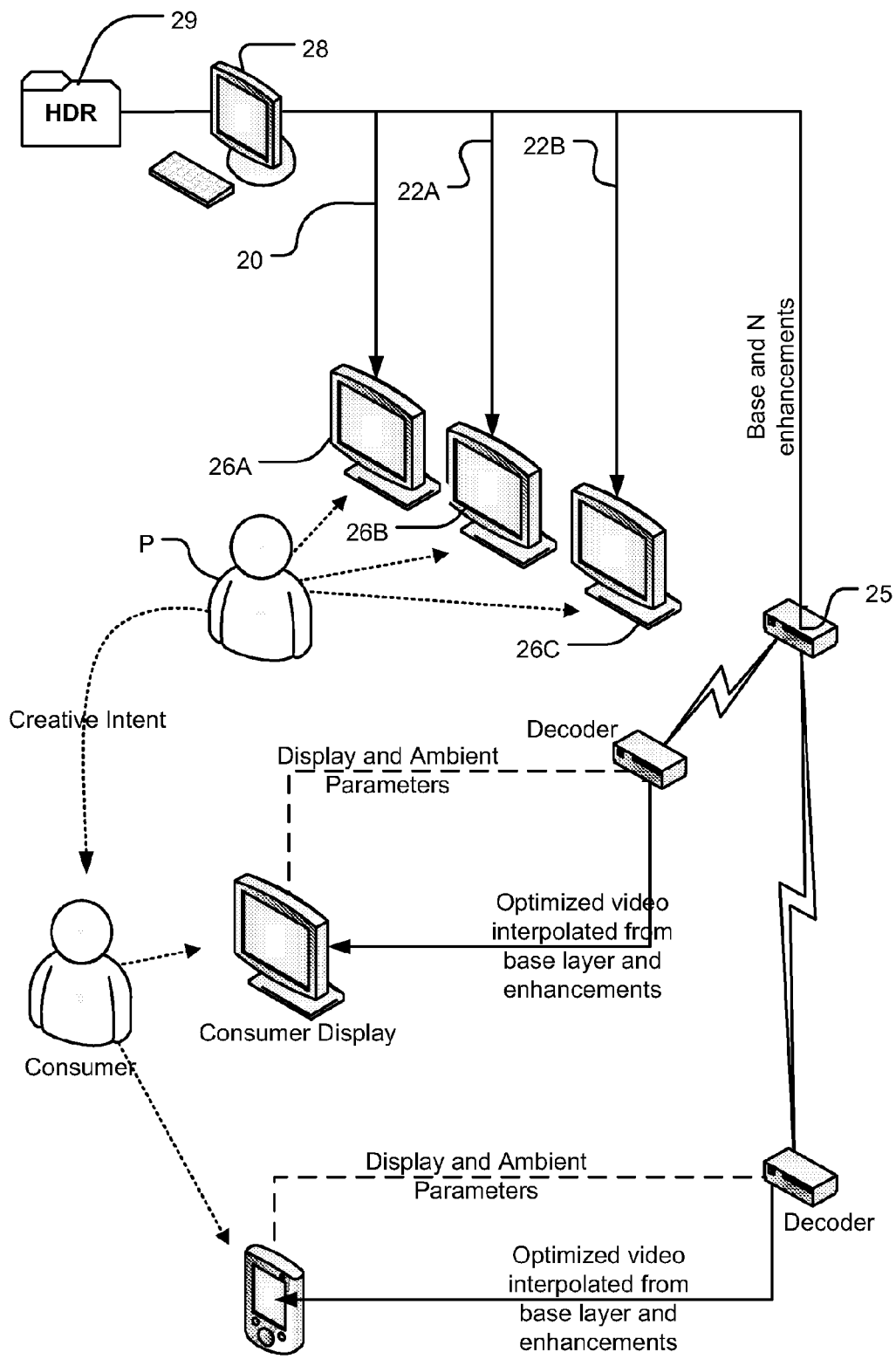
FIGS. 5A and 5B illustrate video distribution systems according to example embodiments.
Figure 5B:
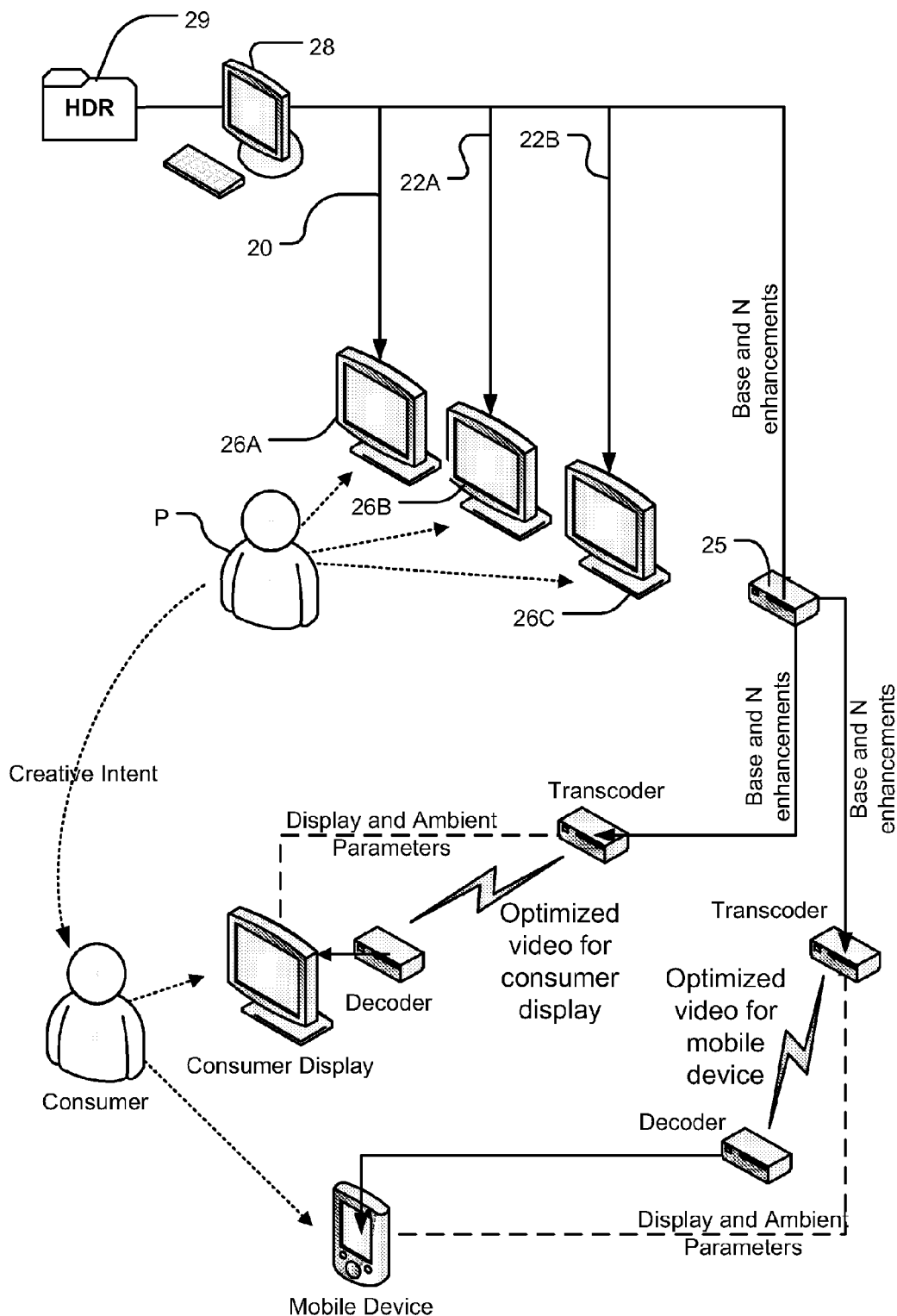

FIGS. 5A and 5B illustrate video distribution systems according to example embodiments. In FIG. 5A, video signals containing versions of video content optimized for viewing on destination displays are generated at decoders. The decoders may be local to the destination displays. In FIG. 5B, video signals containing versions of video content optimized for viewing on destination displays are generated at transcoders located upstream from decoders which receive the optimized video signals. In each case, a creative intent instilled in versions of video content by a producer P is delivered to a consumer viewing video content delivered by the system.

Certain implementations of the invention comprise computer processors which execute software instructions which cause the processors to perform a method of the invention. For example, one or more processors in a data processing stage may implement the methods of FIG. 4B by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, non-transitory or physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention.

EEE1. A method for delivering video content optimized for displaying on a destination display, the method comprising:
providing video data comprising at least different first and second versions of the video content; and
interpolating or extrapolating between the first and second versions of the video content to yield a third version of the video content.

EEE2. A method according to EEE 1 wherein the first version is optimized for a first level of ambient light, the second version is optimized for a second level of ambient light and the interpolating or extrapolating is based on a level of ambient light at the destination display.

EEE3. A method according to EEE 2 wherein a light sensor monitors the level of ambient light at the destination display and the method comprises applying relative weightings to the first and second versions of the video content based on the level of ambient light at the destination display detected by the light sensor.

EEE4. A method according to EEE 1 wherein the destination display has a display gamut that is between a first gamut assumed by the first version of the video content and a second gamut assumed by the second version of the video content and the method comprises applying relative weightings to the first and second versions of the video content based on a measure of the display gamut relative to corresponding measures of the first and second gamuts.

EEE5. A method according to EEE 1 wherein each of the versions comprises pixel values for pixels of images and interpolating comprises interpolating between the pixel values for corresponding pixels in the first and second versions.

EEE6. A method according to EEE 5 wherein the pixel values comprise values of coordinates in a perceptually linear color space.

EEE 7. A method according to EEE 1 performed at a transcoder wherein the method comprises encoding the third version of the video content and forwarding the encoded third version from the transcoder to a destination display.

EEE8. A method according to EEE 1 comprising:
receiving identification of a particular device on which the third version of the video content will be displayed; and
controlling the interpolating or extrapolating based at least in part on a display capability of the particular device relative to corresponding display capabilities associated with the first and second versions of the video content.

EEE9. A method according to EEE 8 comprising determining the display capability of the particular device in response to the particular device being connected to receive a download of the video content.

EEE10. A method for delivering video content optimized for displaying on a destination display, the method comprising:
providing in a single data entity video data comprising a plurality of different versions of the video content wherein the different versions include versions having one or more of: different gamuts; different frame rates; different bit depth; and different spatial resolutions;
determining capabilities of a destination display; and,
selecting and decoding one of the different versions for display on the destination display.

EEE11. A method according to EEE 10 wherein decoding the selected one of the different versions comprises decoding a base layer and an enhancement layer and modifying the base layer according to the enhancement layer.

EEE12. Video processing apparatus comprising:
a data processing stage configured to:
read video data encoding a plurality of different versions of a video content wherein the different versions include versions having one or more of: different gamuts; different frame rates; and different bit depths;
determine whether one of the versions is optimized for display on a destination display; and,
in response to determining that one of the version is optimized for display on the destination display, providing the one of the versions for display on the destination display.

EEE13. Video processing apparatus according to EEE 12 comprising an interpolation unit configured to combine at least two of the different versions into an output signal that is an interpolation of the at least two of the different versions.

EEE14. Video processing apparatus according to EEE 13 wherein the interpolation unit comprises a control input and is configured to multiply a difference between corresponding values in the first and second input video signals by an amount based upon a value or values received at the control input.

EEE15. Video processing apparatus according to EEE 14 wherein the control input is connected to receive a signal indicative of ambient lighting conditions at the destination display.

EEE16. Video processing apparatus according to EEE 12 incorporated into the destination display.

EEE17. Video processing apparatus according to EEE 12 incorporated into a transcoder.

EEE18. Video processing apparatus according to EEE 12 wherein the data processing stage is configured to receive information regarding ambient lighting conditions at the destination display and to determine whether one of the versions is optimized for display on the destination display under the ambient lighting conditions.

EEE19. Video processing apparatus comprising:
a decoder configured to extract a base layer and one or more enhancement layers from a video signal to yield a plurality of input signals each encoding a different version of a video content;
an interpolation unit connected to receive the plurality of input signals and to output a an output signal that is an interpolation of the different versions corresponding to the input signals.

EEE20. Video processing apparatus according to EEE 19 connected to receive an ambient lighting signal from a light sensor located to detect ambient lighting conditions at a destination display and to control the interpolation unit based at least in part on a value of the ambient lighting signal.

EEE21. Video processing apparatus according to EEE 19 wherein the interpolation unit is configured to perform interpolation based on capabilities of a target display relative to capabilities associated with the input signals.

EEE22. Video processing apparatus according to EEE 19 wherein the interpolation unit comprises a control input and is configured to multiply a difference between corresponding values in the first and second input video signals by an amount based upon a value or values received at the control input.

EEE23. Video processing apparatus according to EEE 19 wherein the interpolation unit is configured to interpolate or extrapolate following perceptual curves.

EEE24. Video processing apparatus according to EEE 19 wherein the interpolation unit is configured to interpolate or extrapolate on the logarithm of luminance.

EEE25. A non-transitory medium comprising computer-readable video data encoding a plurality of different versions of a video content wherein the different versions include versions that one or more of: have different gamuts; have different frame rates; have different bit depths; and are optimized for viewing under different levels of ambient light.

EEE26. A medium according to EEE 25 wherein the video data comprises a base layer and a plurality of enhancement layers and the different versions comprise the base layer and the base layer in combination with different ones of the enhancement layers.

EEE27. A medium according to EEE 25 wherein the video data comprises a base layer and a plurality of enhancement layers and at least one of the enhancement layers comprises 3D information.

EEE28. A color grading station comprising:
a data store containing a video content;
a plurality of displays;
a controller configured to:
display the video content on each of the plurality of displays;
receive corresponding user input comprising optimizations of the video content for display on each of the plurality of displays; and
store a plurality of versions of the video content, each of the plurality of versions comprising the optimizations associated with one of the plurality of displays; and
combine the plurality of versions into a computer-readable video data encoding the plurality of different versions of the video content.

EEE29. A color grading station according to EEE 28 wherein the video content comprises a base layer and a plurality of enhancement layers.

EEE30. A media server comprising a data store containing a plurality of versions of the same video content and configured to generate optimized video content optimized for display on a destination display by one or more of:
selecting one of the versions of the video content that is optimized for display on the destination display and generating the optimized video content from a plurality of the different versions of the video content.

EEE31. Apparatus comprising any new, useful and inventive feature, combination of features or sub-combination of features as described herein or illustrated in the drawings.

EEE32. Methods comprising any new, useful and inventive step, act, combination of steps and/or acts or sub-combination of steps and/or acts as described herein or illustrated in the drawings.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A method for delivering video content optimized for displaying on a destination display, the method comprising:
receiving video content, the video content comprising a base layer and a plurality of enhancement layers, comprising at least different first and second versions of the video content, the first and second versions depending upon differences within at least one enhancement layer and wherein the first and second versions are optimized for two displays comprising two different dynamic ranges, A and B respectively, but is not optimized for display on the destination display with a third dynamic range, C;
extracting the base layer and one or more enhancement layers from a video content to yield a plurality of input signals each encoding the first and second version of the video content, $y_1$ and $y_2$ respectively;
interpolating or extrapolating between the first and second versions of the video content to yield a third version of the video content, wherein said third version of the video content is optimized for rendering on the destination display with the third dynamic range;
wherein the video signal for third version, $V_{OUT}$, is given as:

$$V_{out} = y_1 + \left(\frac{y_2 - y_1}{B - A}\right)(C - A).$$

2. A method according to claim 1 wherein the first version is optimized for a first level of ambient light, the second version is optimized for a second level of ambient light and the interpolating or extrapolating is based on a level of ambient light at the destination display; and
a light sensor monitors the level of ambient light at the destination display and the method comprises applying relative weightings to the first and second versions of the video content based on the level of ambient light at the destination display detected by the light sensor.

3. A method according to claim 1 wherein the destination display has a display gamut that is between a first gamut assumed by the first version of the video content and a second gamut assumed by the second version of the video content and the method comprises applying relative weightings to the first and second versions of the video content based on a measure of the display gamut relative to corresponding measures of the first and second gamuts.

4. A method according to claim 1 wherein each of the versions comprises pixel values for pixels of images and interpolating comprises interpolating between the pixel values for corresponding pixels in the first and second versions.

5. A method according to claim 4 wherein the pixel values comprise values of coordinates in a perceptually linear color space.

6. A method according to claim 1 performed at a transcoder wherein the method comprises encoding the third version of the video content and forwarding the encoded third version from the transcoder to a destination display.

7. A method according to claim 1 comprising:
receiving identification of a particular device on which the third version of the video content will be displayed; and
controlling the interpolating or extrapolating based at least in part on a display capability of the particular device relative to corresponding display capabilities associated with the first and second versions of the video content.

8. Video processing apparatus comprising:
a decoder configured to extract a base layer and one or more enhancement layers from a video signal to yield a first and second versions of input signals, respectively, each encoding a different version of a video content with for two displays comprising two different dynamic ranges, A and B respectively, but is not optimized for display on a destination display with a third dynamic range, C;
an interpolation unit connected to receive the first and second versions of input signals and to output an output signal that is an interpolation of the different versions corresponding to the input signals to yield a third version of the video content, wherein said third version of the video content is optimized for rendering on the destination display with the third dynamic range;
wherein the video signal for third version, $V_{OUT}$, is given as:

$$V_{out} = y_1 + \left(\frac{y_2 - y_1}{B - A}\right)(C - A);$$

the video processing apparatus being connected to receive an ambient lighting signal from a light sensor located to detect ambient lighting conditions at a destination display and to control the interpolation unit based at least in part on a value of the ambient lighting signal.

9. Video processing apparatus according to claim 8 wherein the interpolation unit is configured to perform interpolation based on capabilities of a target display relative to capabilities associated with the input signals.

10. Video processing apparatus according to claim 8 wherein the interpolation unit comprises a control input and is configured to multiply a difference between corresponding values in the first and second input video signals by an amount based upon a value or values received at the control input.

11. Video processing apparatus according to claim 8 wherein the interpolation unit is configured to interpolate or extrapolate following perceptual curves.

12. Video processing apparatus according to claim 8 wherein the interpolation unit is configured to interpolate or extrapolate on the logarithm of luminance.

* * * * *